(12) United States Patent
Zhang et al.

(10) Patent No.: US 11,442,308 B2
(45) Date of Patent: Sep. 13, 2022

(54) DISPLAY DEVICE HAVING THROUGH HOLE SECTION FOR IMAGE ACQUISITION AND IMAGE DISPLAY

(71) Applicant: WUHAN CHINA STAR OPTOELECTRONICS TECHNOLOGY CO., LTD., Hubei (CN)

(72) Inventors: Peng Zhang, Hubei (CN); Guanghui Liu, Hubei (CN); Chao Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 181 days.

(21) Appl. No.: 16/770,051

(22) PCT Filed: Mar. 27, 2020

(86) PCT No.: PCT/CN2020/081565
§ 371 (c)(1),
(2) Date: Jun. 4, 2020

(87) PCT Pub. No.: WO2021/174617
PCT Pub. Date: Sep. 10, 2021

(65) Prior Publication Data
US 2022/0113589 A1 Apr. 14, 2022

(30) Foreign Application Priority Data
Mar. 2, 2020 (CN) .......................... 202010135305.9

(51) Int. Cl.
*G09G 3/36* (2006.01)
*G02F 1/13357* (2006.01)
(Continued)

(52) U.S. Cl.
CPC .. *G02F 1/133603* (2013.01); *G02F 1/133514* (2013.01); *G02F 1/133524* (2013.01); *G02F 1/133528* (2013.01); *H04N 5/2257* (2013.01)

(58) Field of Classification Search
CPC ......... G02F 1/133603; G02F 1/133524; G02F 1/133528; H04N 5/2257; G09G 3/32; G09G 3/34; G09G 3/36; G09G 3/30
See application file for complete search history.

(56) References Cited

U.S. PATENT DOCUMENTS 10,451,922 B2 * 10/2019 Teragawa .......... G02F 1/133606
2013/0293806 A1 * 11/2013 Yu .................... G02F 1/133524
349/62

(Continued)

FOREIGN PATENT DOCUMENTS

CN 109061946 A * 12/2018
CN 208547789 U 2/2019
(Continued)

*Primary Examiner* — Pegeman Karimi
(74) *Attorney, Agent, or Firm* — PV IP PC; Wei Te Chung; Ude Lu (57) ABSTRACT

A display device is provided, including a backlight module, a liquid crystal cell, a light guide body, a light-emitting unit, and a camera unit. The backlight module includes a backlight section and a through hole section, and the backlight section surrounds at least a portion of the through hole section. The liquid crystal cell is disposed on the backlight module. The light guide body is disposed in the through hole section. The light-emitting unit is disposed on a light incident surface of the light guide body. The camera unit is disposed on a first surface of the light guide body. The display device and a corresponding part of an opening area cannot display an image correctly, which is prevented.

19 Claims, 4 Drawing Sheets

(51) Int. Cl.
*G02F 1/1335* (2006.01)
*H04N 5/225* (2006.01)

(56) References Cited

U.S. PATENT DOCUMENTS

| | | | |
|---|---|---|---|
| 2020/0096813 A1* | 3/2020 | Huang | G02F 1/133512 |
| 2020/0292882 A1* | 9/2020 | Nakamura | H04M 1/0264 |
| 2021/0124194 A1* | 4/2021 | Liu | G02F 1/133504 |
| 2021/0182525 A1* | 6/2021 | Zhang | G02F 1/133606 |

FOREIGN PATENT DOCUMENTS

| | | |
|---|---|---|
| CN | 110161749 A | 8/2019 |
| CN | 110703496 A | 1/2020 |
| CN | 110837190 A | 2/2020 |
| CN | 110850633 A | 2/2020 |
| JP | 2009194145 A | 8/2009 |

* cited by examiner

DISPLAY DEVICE HAVING THROUGH HOLE SECTION FOR IMAGE ACQUISITION AND IMAGE DISPLAY

RELATED APPLICATIONS

This application is a Notional Phase of PCT Patent Application No. PCT/CN2020/081565 having international filing date of Mar. 27, 2020, which claims the benefit of priority of Chinese Patent Application No. 202010135305.9 filed on Mar. 2, 2020. The contents of the above applications are all incorporated by reference as if fully set forth herein in their entirety.

FIELD OF DISCLOSURE

The present disclosure relates to the field of displays, and in particular to a display device.

BACKGROUND

With a development of a full-screen technology, how to maximize a screen-to-body ratio has become a research hotspot in a field of a display technology. A first generation of the full-screen technology mainly focuses on a screen size ratio changed from 16:9 to 18:9 or even larger. A second generation of the full screen is to further compress upper, lower, left, and right borders of a screen, and even uses a flexible folding technology to maximize a visible area. Recent research on the full screen focuses on how to integrate a fingerprint recognition, a camera, a face recognition, a distance sensing, and other sensors of a display terminal into a display area of a display to achieve a true full-screen display technology.

Mainstream display technologies include a liquid crystal display (LCD) technology and an organic light-emitting diode (OLED) technology. The LCD technology is a passive light-emitting technology, which illuminates a liquid crystal cell through a full-surface backlight structure to achieve a brightness and darkness adjustment of an optical fiber. However, due to an existence of an opening area of the LCD, a portion of a display device corresponding to the opening area of the LCD cannot properly display an image, so that a true full-screen design cannot be realized.

Therefore, it is necessary to propose a new technical solution to solve the above technical problems.

SUMMARY OF DISCLOSURE

An embodiment of the present disclosure provides a display device, which is configured to prevent that the display device and the opening area cannot display images normally.

An embodiment of the present disclosure provides a display device includes a backlight module, a liquid crystal cell, a light guide body, a light-emitting unit, and a camera unit.

The backlight module includes a backlight section and a through hole section, and the backlight section surrounds at least a portion of the through hole section.

The liquid crystal cell is disposed on the backlight module.

The light guide body is disposed in the through hole section.

The light-emitting unit is disposed on a light incident surface of the light guide body.

The camera unit is disposed on a first surface of the light guide body.

In the display device of the embodiment of the present disclosure, the display device further includes a control unit. The control unit is electrically connected to the light-emitting unit and the camera unit, and the control unit is configured to control the camera unit to be turned off in response to the light-emitting unit being turned on, and the control unit is configured to control the light-emitting unit to be turned off in response to the camera unit being turned on.

In the display device of the embodiment of the present disclosure, the light guide body includes a main body and a coupling portion.

The main body includes a first surface and a second surface. The first surface is disposed away from the liquid crystal cell and corresponds to a hollow section of a first polarizer of the liquid crystal cell, and the first surface is configured to transmit light from an external environment toward a portion of the liquid crystal cell corresponding to the through hole section. The second surface is disposed opposite to the first surface, and is configured to transmit light emitted from the light-emitting unit or the light from the external environment toward the portion of the liquid crystal cell corresponding to the through hole section.

The coupling portion is connected to the main body and including at least one light incident surface, the coupling portion is disposed correspondingly to a light-exiting surface of the light-emitting unit, and is configured to transmit the light emitted by the light-emitting unit.

In the display device of the embodiment of the present disclosure, the light incident surface of the coupling portion is provided with a first optical microstructure.

In the display device of the embodiment of the present disclosure, the first optical microstructure includes a dot pattern microstructure.

In the display device of the embodiment of the present disclosure, a diameter of the dot pattern microstructure ranges from 20 micrometers to 100 micrometers, and a depth of the dot pattern microstructure ranges from 1 micrometer to 10 micrometers.

In the display device of the embodiment of the present disclosure, at least one of the first surface and the second surface of the main body is provided with a second optical microstructure.

In the display device of the embodiment of the present disclosure, an angle between the light-exiting surface of the light-emitting unit and the light incident surface of the coupling portion is an acute angle, and the light incident surface is configured to refract the light of the light-emitting unit into the light guide body.

In the display device of the embodiment of the present disclosure, the coupling portion further includes a reflective surface configured to reflect the light emitted by the light-emitting unit to the second surface.

In the display device of the embodiment of the present disclosure, the light-exiting surface of the light-emitting unit is parallel to the light incident surface of the coupling portion, and the light incident surface of the coupling portion is configured to guide the light emitted from the light-exiting surface of the light-emitting unit, the reflective surface of the coupling portion is configured to reflect the light of the light incident surface of the coupling portion to the second surface.

In the display device of the embodiment of the present disclosure, at least a part of the camera unit is embedded in the light guide body, or at least a part of the camera unit is near the light guide body.

In the display device of the embodiment of the present disclosure, the display device further includes a support member disposed away from the backlight module, and the support member supports the light-emitting unit and/or the light guide body.

In the display device of the embodiment of the present disclosure, the support member includes a support plate and a support frame, or a fixed frame and a clamp.

In the display device of the embodiment of the present disclosure, the light-emitting unit includes a miniature light-emitting diode (mini-LED) unit, a micro-LED unit, and a frame lamp light-emitting unit.

In the display device of the embodiment of the present disclosure, the light guide body is a solid structure.

In the display device of the embodiment of the present disclosure, material of the light guide body includes at least one of polycarbonate, polymeric methyl methacrylate, and tempered glass.

In the display device of the embodiment of the present disclosure, a shape of the light guide body includes a cylinder and a polygon.

In the display device of the embodiment of the present disclosure, the liquid crystal cell includes a first polarizer, an array substrate, a liquid crystal layer, a color filter substrate, and a second polarizer.

In the display device of the embodiment of the present disclosure, portions of the first polarizer and the second polarizer corresponding to the through hole section are hollow, and the first polarizer and the second polarizer are configured to receive light from an external environment, and to receive light emitted by the light-emitting unit through the light guide body.

In comparison with a display device in the prior art, the through hole section of the backlight module of the display device of the embodiments of the present disclosure is provided with the light guide body. The mini-LED, the micro-LED, or the frame lamp serve as the light-emitting unit. The light-emitting unit guides light to the through hole section through the light guide body, so it provides light for the display device portion in the through hole section, thereby preventing that a portion of the display device corresponding to an opening area cannot display images normally.

Also, the light-emitting unit, the camera unit, and the control unit are connected to achieve an controllable brightness adjustment, so that an image displayed in the opening area of the backlight module is consistent with an image displayed in the display area of the display device, thereby realizing a true full-screen display technology.

Moreover, a surface of the light guide body is provided with the optical microstructure to achieve uniform brightness compensation.

BRIEF DESCRIPTION OF DRAWINGS

To describe the technical solutions in the embodiments of the disclosure or in the prior art more clearly, the following briefly introduces the accompanying drawings required for describing the embodiments. Apparently, the accompanying drawings in the following description show merely some embodiments of the disclosure, and a person of ordinary skill in the art may still derive other drawings from these accompanying drawings without creative efforts.

DETAILED DESCRIPTION

The technical solutions in the embodiments of the present disclosure are clearly and completely described herein with reference to the drawings in the embodiments of the present disclosure. Apparently, the described embodiments represent only some and not all of the embodiments of the present disclosure. All other embodiments obtained by one of ordinary skill in the art based on the embodiments of the present disclosure fall within the scope of protection of the present disclosure.

In order to make the purpose of the present disclosure, the technical solutions, and advantages more clear, the present disclosure will be described in further detail below with reference to the drawings. Please refer to the accompanying drawings, similar parts are denoted with the same reference numerals. The following description is based on the particular embodiments of the present disclosure, and they should not be construed as limiting the disclosure to the other embodiments which are not discussed in detail herein. As used herein, the word "exemplary" means "serving as an example, instance, or illustration. In addition, the articles "a" and "an" as used in this application and the appended claims may generally be construed to mean "one or more" unless specified otherwise or clear from context to be directed to a singular form.

In the description of the present disclosure, it should be indicated that unless otherwise specified and defined, terms "mount", "joint", and "connect" should be understood in a broad sense, for example, the connection can be a fixed connection, a detachable connection, or an integrated connection. It can be a mechanical connection or an electrical connection or mutual communication. It can be a direct connection or an indirect connection through an intermediate medium. It also can be an inner communication between two elements or interaction between two elements. For a person ordinarily skilled in the art, specific meanings of the above-mentioned terms in the present disclosure can be understood according to specific circumstances.

Figure 1:
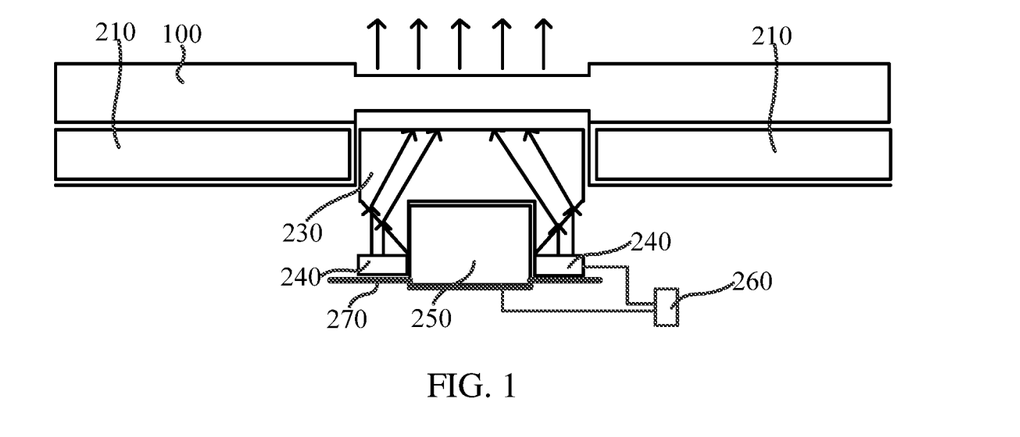
FIG. 1 is a schematic diagram of a display device of an embodiment of the present disclosure.
Figure 2:
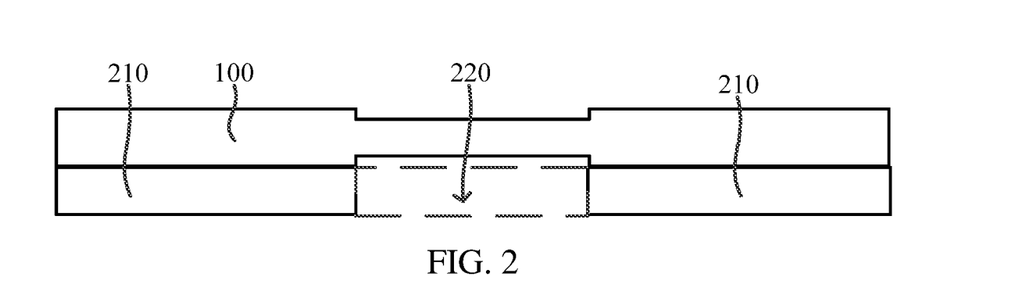
FIG. 2 is a schematic diagram showing a position relationship between a backlight module and a liquid crystal cell of the display device of the embodiment of the present disclosure.
Figure 3:
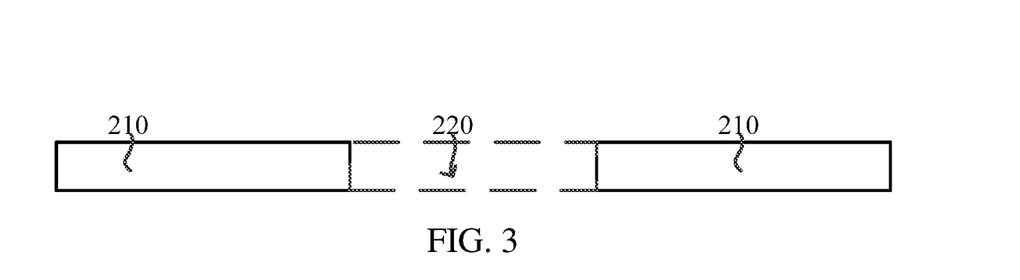
FIG. 3 is a schematic diagram of the backlight module of the display device of the embodiment of the present disclosure.

Referring to FIG. 1, FIG. 2 and FIG. 3, an embodiment of the present disclosure provides a display device. The display device includes a backlight module. The backlight module includes a backlight section 210 and a through hole section 220. The backlight section 210 surrounds at least a portion of the through hole section 220. The liquid crystal cell 100 is disposed on the backlight module 200. The light guide body 230 is disposed in the through hole section 220. The light-emitting unit 240 is disposed on a light incident surface of the light guide body 230. The camera unit 250 is disposed on a first surface of the light guide body 230.

Figure 4:
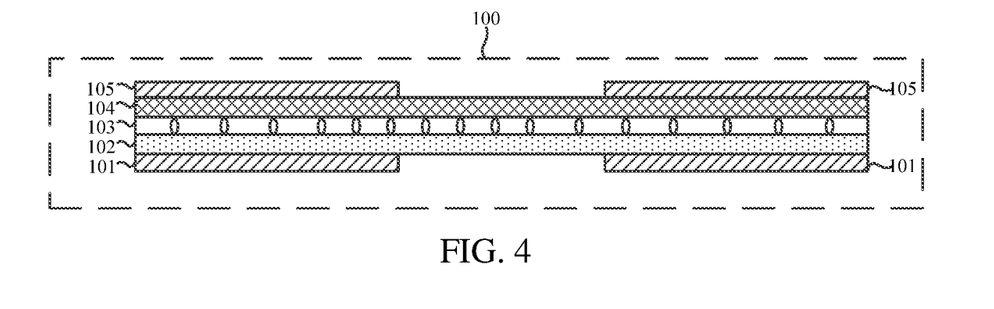
FIG. 4 is a schematic diagram of the liquid crystal cell of the display device of the embodiment of the present disclosure.

Specifically, as shown in FIG. 4, the liquid crystal cell 100 includes a first polarizer 101, an array substrate 102, a liquid crystal layer 103, a color filter substrate 104, and a second polarizer 105. The array substrate 102 is disposed on the first polarizer 101. The color filter substrate 104 is disposed on the array substrate. The liquid crystal layer 103 is disposed between the color filter substrate 104 and the array substrate 102. The second polarizer 105 is disposed on the color filter substrate 104. A liquid crystal material in the liquid crystal layer 103 includes a polymer dispersed liquid crystal (PDLD) and a polymer network liquid crystal (PNLD). Under an action of an electric field, an arrangement direction of liquid crystal molecules is changed to change a transmittance of an external light source, so as to complete a change from light to electricity. Utilizing different excitations of three primary color signals of red (R), green (G), and blue (B), the red, green, and blue primary color filters are used to complete a color reproduction in time and space domains. It should be noted that positions of the first polarizer 101 and the second polarizer 105 corresponding to the through hole section 220 are hollowed out for receiving light from an external environment and receiving light emitted by the light-emitting unit 240 through the light guide body 230. The liquid crystal cell 100 is disposed on the backlight module 200. The backlight module 200 includes a light source, a light guide plate, a diffusion sheet, a light enhancement sheet, a back plate, and the like. Alternatively, an opening is provided at a position corresponding to a side of the through hole section 220 on the back plate. The light source transmits light on the light guide plate to the through hole section 220 through the opening.

Figure 5:
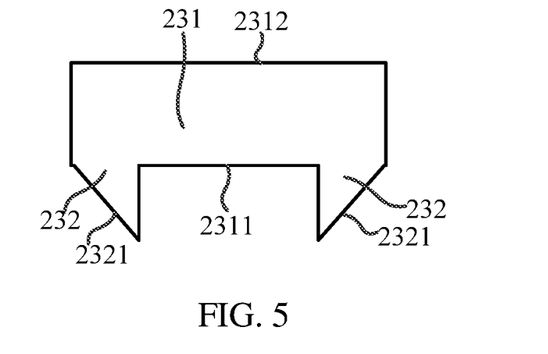
FIG. 5 is a schematic diagram of the light guide body of the display device of the embodiment of the present disclosure.

Furthermore, referring to FIG. 1 and FIG. 5, a light-emitting unit 240 is disposed at a corresponding position on a light incident surface of the light guide body 230. The light guide body 230 includes a main body 231 and a coupling portion 232.

The main body 231 includes a first surface 2311 and a second surface 2312. The first surface 2311 is disposed away from the liquid crystal cell 100 and corresponds to a hollow section of the first polarizer 101 of the liquid crystal cell 100. The first surface 2311 is configured to transmit light from an external environment toward a portion of the liquid crystal cell 100 corresponding to the through hole section 200. The second surface 2312 is disposed opposite to the first surface 2311, and is configured to transmit light emitted from the light-emitting unit 240 or the light from the external environment toward the portion of the liquid crystal cell 100 corresponding to the through hole section.

The coupling portion 232 is connected to the main body 231 and includes at least one light incident surface 2321. The coupling portion 232 is disposed correspondingly to a light-exiting surface of the light-emitting unit 240, and is configured to transmit the light emitted by the light-emitting unit 240.

Specifically, the light-emitting unit 240 includes a miniature light-emitting diode (mini-LED) unit, a micro-LED unit, and a frame lamp light-emitting unit. Material of the light guide body 230 includes polycarbonate (PC), polymeric methyl methacrylate (PMMA), and tempered glass, etc.

Furthermore, in the embodiment of the present disclosure, the light incident surface 2321 of the coupling portion 232 is provided with a first optical microstructure. At least one of the first surface 2311 and the second surface 2312 of the main body 231 is provided with a second optical microstructure. Specifically, one light incident surface 2321 of the coupling portion 232 is provided with the first optical microstructure, or two light incident surfaces 2321 of the coupling portion 232 are provided with the first optical microstructure, so that the light of the light source is evenly distributed in the through hole section 220. The first surface 2311 and the second surface 2312 of the main body 231 of the light guide body 230 are provided with a mirror structure. Alternatively, at least one of the first surface 2311 and the second surface 2312 is provided with the second optical microstructure. That is, the first surface 2311 is provided with the second optical microstructure, and the second surface 2312 is provided with a light uniform structure. Alternatively, the second surface 2312 is provided with the second optical microstructure, and the first surface 2311 is provided with the light uniform structure. It should be noted that the optical microstructures of the first optical microstructure and the second optical microstructure include a dot pattern microstructure, a polygonal pyramidal microstructure connected to form a square, and a prism microstructure. The optical microstructures are configured to enhance a light transmittance of the light incident surface 2321, the first surface 2311, and the second surface 2312 to achieve uniform brightness compensation. The dot pattern microstructure has a diameter ranging from 20 micrometers to 100 micrometers, and the dot pattern microstructure has a depth ranging from 1 micrometer to 10 micrometers.

Furthermore, an angle between the light-exiting surface of the light-emitting unit 230 and the light incident surface 2321 of the coupling portion 232 is an acute angle. The light-exiting surface is configured to refract light from the light-emitting unit 230 into the light guide body 230. In a specific embodiment of the present disclosure, the angle between the light-exiting surface of the light-emitting unit 230 and the light incident surface 2321 of the coupling portion 232 may be 5 degrees, 10 degrees, 20 degrees, 30 degrees, 40 degrees, 50 degrees, 60 degrees, 70 degrees, 80 degrees, etc. The light transmitted from the light incident surface 232 is projected through the second surface 2312 to the liquid crystal cell 100 corresponding to an upper surface of the through hole section 220 to compensate a brightness of a part of the display device corresponding to the camera unit 250, so that a portion of the display device corresponding to the through hole section 200 can work normally, and a normal operation of the camera unit 250 will not be affected. It should be noted that, in the embodiment of the present disclosure, the light incident surface 2321, the first surface 2311, and the second surface include an inner surface and an outer surface. That is, the provision of the first optical microstructure on the light incident surface 2321 of the coupling portion 232 means that the first optical microstructure is provided on the inner surface and/or the outer surface of the light incident surface 2321. At least one of the first surface 2311 and the second surface 2312 provided with the second optical microstructure means that at least one of the inner surface and/or the outer surface of the first surface 2311 and the inner surface and/or the outer surface of the second surface 2312 is provided with the second optical microstructure.

In the embodiment of the present disclosure, the display device further includes a control unit 260.

The control unit 260 is electrically connected to the light-emitting unit 240 and the camera unit 250. The control unit 260 is configured to control the camera unit 250 to be turned off when the light-emitting unit 240 is turned on, and is configured to control the light-emitting unit 260 to be turned off when the camera unit 250 is turned on.

Specifically, referring to FIG. 1, the light incident surface 2321 of the coupling portion 232 of the light guide body 230 is configured to introduce light emitted from a light-exiting surface of the light-emitting unit 240. The light emitted from the light-exiting surface of the light-emitting unit 230 is refracted at the light incident surface 232 to be introduced into the second surface 2312 of the main body 231 of the light guide body 230 and then it passes through the first surface 2311. Therefore, the liquid crystal cell 100 at a position corresponding to the through hole section 220 is provided with light, thereby compensating the display device at the position corresponding to the area.

In the embodiment of the present disclosure, the display device further includes a support member 270.

The support member 270 is disposed away from the backlight module 200. The support member 270 supports the light-emitting unit 240 and/or the light guide body 250. The support member 270 includes a support plate and a support frame, or a fixed frame and a clamp.

Figure 6:
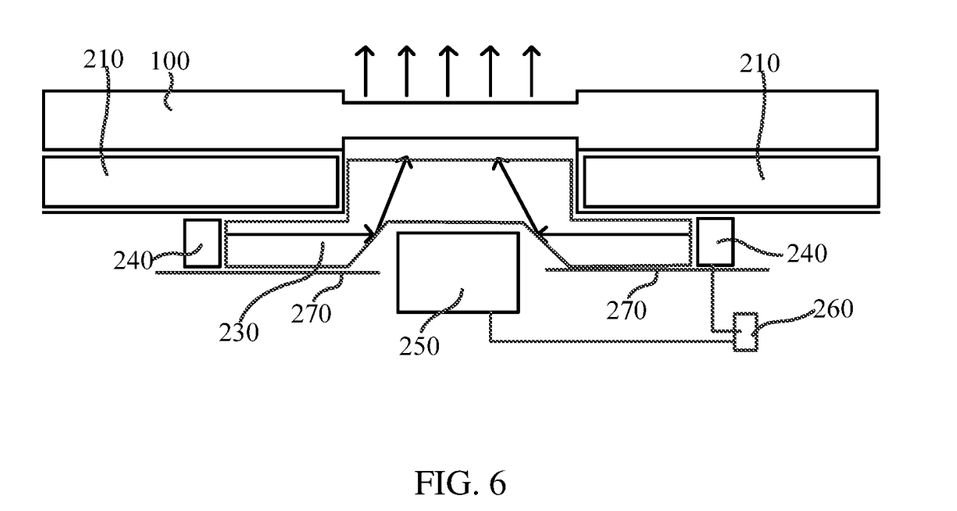
FIG. 6 is a schematic diagram of a display device of another embodiment of the present disclosure.
Figure 7:
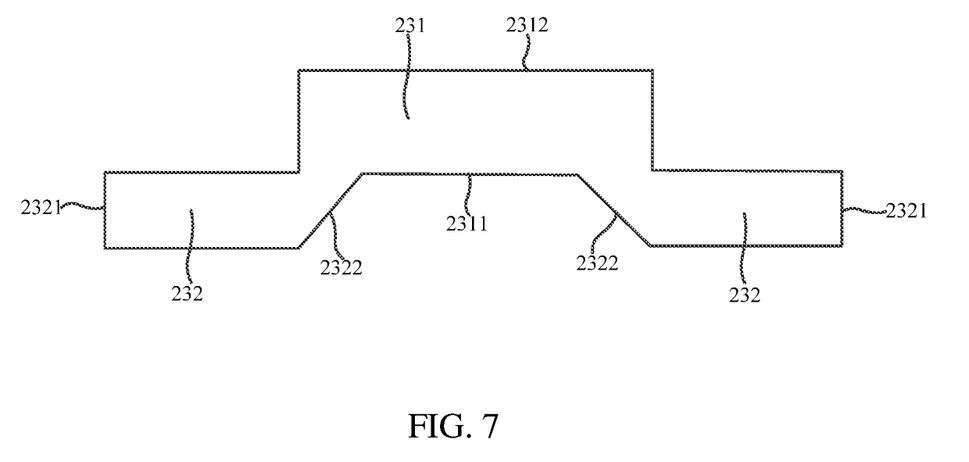
FIG. 7 is a schematic diagram of a light guide body of the display device of the embodiment of the present disclosure.

Alternatively, referring to FIG. 6 and FIG. 7, the coupling portion 232 further includes a reflective surface 2322.

The reflective surface 2322 is configured to reflect light emitted by the light-emitting unit 230 to the second surface 2312. The light-exiting surface of the light-emitting unit 230 is parallel to the light incident surface 2321 of the coupling portion 232. The light incident surface 2321 of the coupling portion 232 is configured to guide light emitted from the light-exiting surface of the light-emitting unit 230. The reflective surface 2322 of the coupling portion 232 is configured to reflect light from the light incident surface 2321 of the coupling portion 232 to the second surface 2311. Specifically, the light incident surface 2321 of the coupling portion 232 of the light guide body 230 is configured to introduce the light emitted from the light-exiting surface of the light-emitting unit 240. The light emitted from the light-exiting surface of the light-emitting unit 240 is refracted at the reflective surface 2322 to be introduced into the second surface 2312 of the main body 231 of the light guide body 230. Therefore, the display device at a position corresponding to the through hole section 220 is provided with light, thereby compensating the display device at the position corresponding to the area. It should be noted that the reflective surface 2322 of the embodiment of the present disclosure may be provided with a third optical microstructure. The optical microstructure of the third optical microstructure portion includes a dot pattern microstructure, a polygonal pyramidal microstructure connected to form a square, and a prism microstructure. The reflective surface 2322 is configured to enhance a light transmittance of the light incident surface 2321, the first surface 2311, and the second surface 2312 to achieve uniform brightness compensation. The dot pattern microstructure has a diameter ranging from 20 micrometers to 100 micrometers. A depth of the dot pattern microstructure ranges from 1 micrometer to 10 micrometers.

Alternatively, at least a part of the camera unit 250 is embedded in the light guide body 230, or at least a part of the camera unit 250 is close to the light guide body 230.

Figure 8:
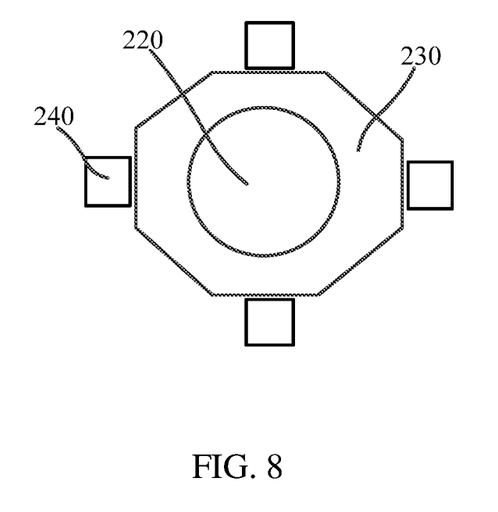
FIG. 8 to FIG. 10 are schematic diagrams showing a position relationship between a through hole section and a backlight module of a display device of embodiments of the present disclosure.
Figure 9:
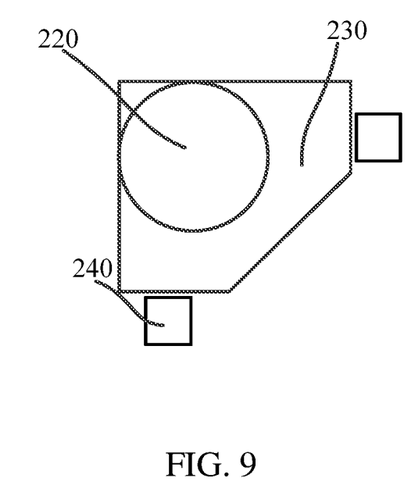
Figure 10:
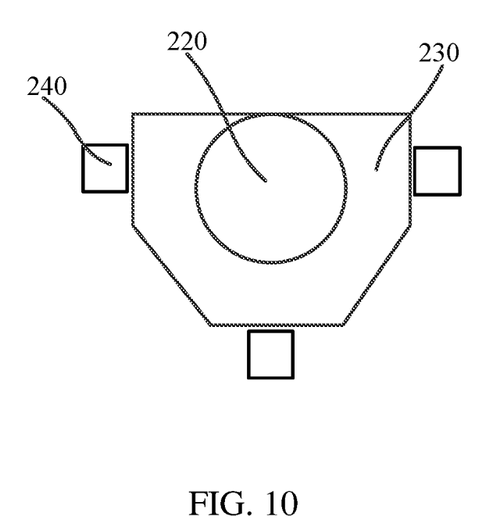

It should be noted that, in the embodiment of the present disclosure, a shape of the light guide body 230 can be adjusted according to actual production requirements. The shape of the light guide body includes a cylinder and a polygon. A definition of polyhedron should be broad, including regular polyhedron and irregular polyhedron. Specifically, as shown in FIG. 8, when the through hole section 220 is disposed in a middle of the backlight section 210, the backlight section 210 surrounds both sides of the through hole section 220. As shown in FIG. 9, when the through hole section 220 is disposed on a left or right side of the backlight section 210, the backlight section 210 surrounds at least a part of the through hole section 220. When the through hole section 220 is disposed on an upper side of the middle of the backlight section 210, the backlight section 210 surrounds at least a portion of the through hole section 220. It should be noted that the light guide body 230 is provided with at least one light-emitting unit 240.

In comparison with a display device in the prior art, the through hole section of the backlight module of the display device of the embodiments of the present disclosure is provided with the light guide body. The mini-LED, the micro-LED, or the frame lamp serve as the light-emitting unit. The light-emitting unit guides light to the through hole section through the light guide body, so it provides light for the display device portion in the through hole section, thereby preventing that a portion of the display device corresponding to an opening area cannot display images normally.

Also, the light-emitting unit, the camera unit, and the control unit are connected to achieve an controllable brightness adjustment, so that an image displayed in the opening area of the backlight module is consistent with an image displayed in the display area of the display device, thereby realizing a true full-screen display technology.

Moreover, a surface of the light guide body is provided with the optical microstructure to achieve uniform brightness compensation.

In summary, the above descriptions are merely preferred embodiments of the present disclosure, and are not intended to limit the scope of the present disclosure. Any modification or replacement made by those skilled in the art without departing from the spirit and principle of the present disclosure should fall within the protection scope of the present disclosure. Therefore, the protection scope of the present disclosure is subject to the appended claims.

What is claimed is:

1. A display device, comprising:
    a backlight module comprising a backlight section and a through hole section, wherein the backlight section surrounds at least a portion of the through hole section;
    a liquid crystal cell disposed on the backlight module;
    a light guide body disposed in the through hole section;
    a light-emitting unit disposed on a light incident surface of the light guide body;
    a camera unit disposed on a first surface of the light guide body;
    a controller electrically connected to the light-emitting unit and the camera unit, wherein the controller is configured to control the camera unit to be turned off in response to the light-emitting unit being turned on, and the controller is configured to control the light-emitting unit to be turned off in response to the camera unit being turned on.

2. The display device as claimed in claim 1, wherein at least a part of the camera unit is embedded in the light guide body, or at least a part of the camera unit is near the light guide body.

3. The display device as claimed in claim 1, further comprising a support member disposed away from the backlight module, and the support member supports the light-emitting unit and/or the light guide body.

4. The display device as claimed in claim 3, wherein the support member comprises a support plate and a support frame, or a fixed frame and a clamp.

5. The display device as claimed in claim 1, wherein the light-emitting unit comprises a miniature light-emitting diode (mini-LED) unit, a micro-LED unit, and a frame lamp light-emitting unit.

6. The display device as claimed in claim 1, wherein the light guide body is a solid structure.

7. The display device as claimed in claim 6, wherein material of the light guide body comprises at least one of polycarbonate, polymeric methyl methacrylate, and tempered glass.

8. The display device as claimed in claim 1, wherein a shape of the light guide body comprises a cylinder and a polygon.

9. The display device as claimed in claim 1, wherein the liquid crystal cell comprises a first polarizer, an array substrate, a liquid crystal layer, a color filter substrate, and a second polarizer.

10. The display device as claimed in claim 9, wherein portions of the first polarizer and the second polarizer corresponding to the through hole section are hollow, and the first polarizer and the second polarizer are configured to receive light from an external environment, and to receive light emitted by the light-emitting unit through the light guide body.

11. A display device, comprising:
 a backlight module comprising a backlight section and a through hole section, wherein the backlight section surrounds at least a portion of the through hole section;
 a liquid crystal cell disposed on the backlight module;
 a light guide body disposed in the through hole section;
 a light-emitting unit disposed on a light incident surface of the light guide body;
 a camera unit disposed on a first surface of the light guide body;
 wherein the light guide body comprises:
 a main body comprising a first surface and a second surface, wherein the first surface is disposed away from the liquid crystal cell and corresponds to a hollow section of a first polarizer of the liquid crystal cell, and the first surface is configured to transmit light from an external environment toward a portion of the liquid crystal cell corresponding to the through hole section; and the second surface is disposed opposite to the first surface, and is configured to transmit light emitted from the light-emitting unit or the light from the external environment toward the portion of the liquid crystal cell corresponding to the through hole section; and
 a coupling portion connected to the main body and comprising at least one light incident surface, wherein the coupling portion is disposed correspondingly to a light-exiting surface of the light-emitting unit, and is configured to transmit the light emitted by the light-emitting unit.

12. The display device as claimed in claim 11, wherein the light incident surface of the coupling portion is provided with a first optical microstructure.

13. The display device as claimed in claim 12, wherein the first optical microstructure comprises a dot pattern microstructure.

14. The display device as claimed in claim 13, wherein a diameter of the dot pattern microstructure ranges from 20 micrometers to 100 micrometers, and a depth of the dot pattern microstructure ranges from 1 micrometer to 10 micrometers.

15. The display device as claimed in claim 11, wherein at least one of the first surface and the second surface of the main body is provided with a second optical microstructure.

16. The display device as claimed in claim 11, wherein an angle between the light-exiting surface of the light-emitting unit and the light incident surface of the coupling portion is an acute angle, and the light incident surface is configured to refract the light of the light-emitting unit into the light guide body.

17. The display device as claimed in claim 11, wherein the coupling portion further comprises a reflective surface configured to reflect the light emitted by the light-emitting unit to the second surface.

18. The display device as claimed in claim 17, wherein the light-exiting surface of the light-emitting unit is parallel to the light incident surface of the coupling portion, and the light incident surface of the coupling portion is configured to guide the light emitted from the light-exiting surface of the light-emitting unit, the reflective surface of the coupling portion is configured to reflect the light of the light incident surface of the coupling portion to the second surface.

19. A display device, comprising:
 a backlight module comprising a backlight section and a through hole section, wherein the backlight section surrounds at least a portion of the through hole section;
 a liquid crystal cell disposed on the backlight module;
 a light guide body disposed in the through hole section;
 a light-emitting unit disposed on a light incident surface of the light guide body; and
 a camera unit disposed on a first surface of the light guide body;
 wherein the liquid crystal cell comprises a first polarizer, an array substrate, a liquid crystal layer, a color filter substrate, and a second polarizer; wherein
 wherein portions of the first polarizer and the second polarizer corresponding to the through hole section are hollow, and the first polarizer and the second polarizer are configured to receive light from an external environment, and to receive light emitted by the light-emitting unit through the light guide body.

* * * * *